United States Patent [19]

McArthur

[11] 3,883,442

[45] May 13, 1975

[54] NON-SHRINKING ALUMINA-BASED CATALYST COMPOSITIONS

[75] Inventor: Dennis P. McArthur, Yorba Linda, Calif.

[73] Assignee: Union Oil Company of California, Los Angeles, Calif.

[22] Filed: Dec. 26, 1973

[21] Appl. No.: 428,139

Related U.S. Application Data

[63] Continuation-in-part of Ser. No. 255,180, May 19, 1972, abandoned.

[52] U.S. Cl. ............. 252/432; 252/477; 423/213.2; 423/213.5

[51] Int. Cl. ........................................ B01j 11/82

[58] Field of Search ......... 252/432, 477 R; 423/213, 423/213.2, 213.5

[56] References Cited

UNITED STATES PATENTS

| | | | |
|---|---|---|---|
| 2,125,743 | 8/1938 | Sweeney et al. | 252/432 X |
| 2,392,588 | 1/1946 | Greensfelder et al. | 252/432 X |
| 2,564,268 | 8/1951 | Mathy et al. | 252/432 X |
| 2,976,333 | 3/1961 | Dixon et al. | 252/432 X |
| 3,133,029 | 5/1964 | Hoekstra | 423/213 X |
| 3,202,724 | 8/1965 | Keough | 252/432 X |
| 3,449,063 | 6/1969 | Griffing et al. | 423/213 |
| 3,598,879 | 8/1971 | Kmecak et al. | 252/432 X |
| 3,631,030 | 12/1971 | Brenner | 252/432 X |

*Primary Examiner*—Patrick P. Garvin
*Attorney, Agent, or Firm*—Lannas S. Henderson; Richard C. Hartman; Dean Sandford

[57] ABSTRACT

Preshaped forms, e.g., pellets, of high-surface-area alumina are impregnated with a solution of a boron compound which upon calcination yields $B_2O_3$, then dried and calcined at temperatures between about 675° and 1400°C. The resulting product has a moderately high surface area and pore volume, and undergoes substantially no shrinkage when utilized for catalytic purposes at temperatures up to about 1600°C. For catalytic purposes, the thus stabilized alumina forms may be utilized as such, or they may be impregnated with salts of catalytic metals and again calcined to yield supported catalysts of similar physical stability.

11 Claims, No Drawings

NON-SHRINKING ALUMINA-BASED CATALYST COMPOSITIONS

RELATED APPLICATIONS

This application is a continuation-in-part of Ser. No. 255,180, filed May 19, 1972, now abandoned.

BACKGROUND AND SUMMARY OF INVENTION

The use of high surface area, so-called "transition" aluminas, including species now commonly identified as Chi, Delta, Eta, Gamma, Kappa and Theta aluminas, as supports for catalytic metals is well known in the art. Commonly, such aluminas are preformed into desired consolidated shapes as by tableting, prilling, extruding, casting or other well known techniques to form cylindrical pellets or extrudates, spheres or other granular forms ranging in size from about 1/32-inch up to about ½-inch. For some applications, a monolithic form is sometimes prepared as by casting or molding a wet alumina paste containing combustible fibrous material which is later removed by combustion to give a monolithic body traversed by suitable channels for fluid flow from one face of the monolith to an opposite face. As originally produced, the specific surface area of these catalyst supports normally ranges between about 100 and 500 square meters per gram, while the internal pore volume ranges between about 0.3 and 1.0 ml/gm. When these alumina supports are impregnated with a suitable active metal or metals, a wide variety of useful catalysts may be produced which are active and physically stable up to temperatures of about 500° – 800°C., depending upon the type of active metals present, as well as other factors.

However, the transition aluminas are inherently unstable thermodynamically. In the temperature range of about 900° – 1200°C., gamma alumina is transformed to alpha alumina with concomitant marked reduction in surface area and pore volume. This transformation occurs rapidly only at temperatures greater than about 1050°C. At lower temperatures, such as those commonly employed in catalytic processes, the transformation is very slow, but it does occur over an extended period of time.

In the case of supported catalysts, the presence of transitional metals or their oxides, notably iron and copper, can accelerate this transformation to alpha alumina and cause it to proceed at an appreciable rate even at relatively low temperatures of e.g., 500° – 600°C. This transformation has two very detrimental effects, viz., loss of catalytic surface area, and volume shrinkage with an attendant increase in catalyst bulk density and a decrease in pore volume. The loss in surface area and pore volume leads to a marked decrease in catalyst efficiency in nearly any catalytic process.

The problem of catalyst shrinkage is particularly important in regard to the use of catalysts for converting noxious components in automobile exhaust gas, using the "catalytic muffler" conversion technique. In the case of granular catalysts, the muffler which was originally packed tightly with catalyst becomes only partly filled, resulting in catalyst attrition by mechanical vibration, the catalyst being gradually lost from the exhaust system as dust entrained in the exhaust gas stream. In the case of a monolithic catalyst, shrinkage commonly results in cracking and crumbling of the monolith. Conceivably these shrinkage problems might be alleviated by high temperature precalcination to effect a "preshrinking". This procedure however is not feasible in the case of a monolith, because cracking occurs during the precalcination as a result of differential contraction. In any event, the preshrinking technique would not avoid the unacceptable loss in catalyst surface area and pore volume.

It is a principal object of my invention to stabilize preformed alumina catalyst supports against thermal shrinkage, while preserving therein a substantial desired proportion of the original surface area and pore volume. I have found that this objective can be conveniently and economically achieved by first impregnating the alumina support with a suitable solution of a boron compound which is thermally decomposable to $B_2O_3$, followed by drying and calcining of the impregnated support at temperatures below about 1500°C., but sufficiently high to decompose the boron compound and bring about a chemical combination of the $B_2O_3$ with at least a minor proportion of the alumina. The aluminum borate so formed is thoroughly dispersed throughout the structure and appears to inhibit the thermal conversion of transition aluminas to alpha alumina. As a result, there is little if any shrinkage of the bulk support, and a substantial proportion of the original pore volume and surface area is retained.

DETAILED DESCRIPTION

Suitable alumina starting materials for the catalysts of this invention may comprise any one or more of the above noted transition aluminas, or the mono- and trihydrates, e.g., Gibbsite or Boehmite, either alone or mixed with other relatively inert materials. By conventional methods the powdered alumina is formed into cohesive aggregates, e.g., spheres, prills, beads, extrudates, rings, saddles, irregular granules, etc., or as noted above into suitable porous monolith forms. Normally, it is desirable to calcine the shaped support for about 0.5 to 24 hours at temperatures between about 250° – 600°C. prior to impregnation with the borate solution. However any technique may be utilized which gives sufficiently cohesive aggregates, i.e., aggregates that will retain their shape during the borate impregnation step.

The impregnation step may be carried out by conventional dipping and draining procedures, or by spraying a suitable borate solution into an agitated body of the support, or by other known methods. The boron compound employed may comprise for example orthoboric acid, tetraboric acid, metaboric acid, ammonium pentaborate, ammonium tetraborate, various organic compounds of boron such as the boric acid esters, alkyl boranes and the like. The solvent employed is normally water, but other inorganic or organic solvents may be employed, e.g., glycerine, methanol, ethanol, glycols and the like. From the standpoint of economy, a preferred impregnation solution consists of a saturated water solution of orthoboric acid. Normally, in view of the limited solubility of the more readily available boron compounds, it is preferred to carry out the impregnation at elevated temperatures of e.g., 80° – 150°C. using essentially saturated solutions. The strength of the impregnating solution should be correlated with the pore volume of the alumina so as to achieve an uptake of boron equivalent to about 0.2 – 25 percent, preferably about 1 – 18 percent by weight of $B_2O_3$ upon subsequent calcination.

Following impregnation, the wet support material is normally drained, and is preferably subjected to a brief washing operation to remove excess borate solution from the exterior surfaces only. Following washing, the alumina forms are preferably air dried for 0.5 to 3 hours, and then oven dried at about 100° – 200°C. for about 0.5 – 3 hours.

After drying, the support material is then calcined, normally in air, for about 0.5 to 48 hours, preferably about 1 – 12 hours at temperatures between about 675° and 1500°C., preferably about 800° – 1200°C. It is preferable to raise the support material to the final calcining temperature over a period of about 1 to 5 hours. The overall severity of the calcining treatment is adjusted to provide the desired degree of stability, porosity and surface area in the final composition. These parameters will vary considerably depending upon the intended use of the catalyst. In many catalytic processes extremely high surface areas and pore volumes are not required, or may even be detrimental. Under the less severe conditions of time and temperature, relatively more of the surface area and porosity will be preserved, while conversely at high temperatures and extended times, surface area and porosity will be correspondingly reduced. In any case, it is normally desirable to preserve at least about 1, preferably at least about 2, $m^2/gm$ of surface area. When the ultimate catalyst is intended for use in the conversion of automobile exhaust gases, the calcining should be controlled so as to give a support material having a surface area between about 5 – 100, preferably about 20 – 70 $m^2/gm$, with a porosity of about 0.2 – 0.8, preferably 0.3 – 0.7 ml/gm.

It is definitely preferred that the foregoing calcination be carried out prior to the addition of any metal component (other than alumina) which is capable of combining with $B_2O_3$ at calcination temperatures. Such metals tend to interfere with the stabilization process, and as noted above some of the transitional metals catalyze the conversion of transition aluminas to alpha alumina.

Following calcination, the support material may be impregnated in conventional manner with a solution or solutions of the desired metal salt or salts. Any one or more of the transitional metals may be utilized, the more widely used of such metals being the metals of Groups IB, IIB, VB, VIB, VIIB and VIII of the Periodic Table. Exemplary metals are zinc, cadmium, copper, silver, chromium, molybdenum, tungsten, manganese, rhenium, iron, cobalt, nickel, ruthenium, rhodium, palladium, osmium, iridium, and platinum. In exhaust gas conversion catalysts, the more commonly used metals are copper, chromium, molybdenum, manganese, iron, cobalt, nickel, ruthenium, palladium and platinum, or combinations thereof. The iron group metals, and the metals of Groups IB, IIB, VB, VIB and VIIB are normally employed in proportions ranging between about 3 percent and 30 percent, preferably about 6–20 percent by weight, based on the corresponding oxides. The Group VIII noble metals such as palladium and platinum are normally employed in smaller proportions of about 0.01 – 2 percent by weight. The salts employed for impregnation are preferably those which are thermally decomposable to give the corresponding metal oxides and/or sulfides. Preferred salts are the nitrates, acetates, sulfates and the like. Following impregnation, the finished catalysts are produced by draining, drying and calcining at temperatures of e.g., 100° to 1000°C.

Preferred exhaust gas conversion catalysts comprise rhodium and nickel, or about 5 – 10 percent by weight of copper as CuO with about 5 – 15 weight percent of iron, nickel and/or cobalt as $Fe_2O_3$, NiO or $Co_2O_3$. These metals, especially iron, are apt to bring about severe shrinkage of conventional transition alumina supports at exhaust gas conversion temperatures. But when employed on the supports of this invention, the shrinkage is substantially nil.

The following examples are cited to illustrate the invention, but are not to be construed as limiting in scope:

EXAMPLE I

The thermal instability of a high surface area gamma alumina was demonstrated as follows: A commercially available gamma alumina (Kaiser SAS 5 × 8 prills) was calcined in air at 1000°C. for twenty-four hours. There was a resultant 22 percent loss in bulk volume (22 percent shrinkage). There was also about a 67 percent loss in surface area. The preshrunk alumina prills were then impregnated with a copper nitrate solution to yield a catalyst containing about 6 percent copper by weight. When this catalyst was subsequently calcined in air at 1000°C. for 24 hours it underwent an additional 17 percent loss in bulk volume.

EXAMPLE II

This example demonstrates that some special aluminas which in themselves are sufficiently stable, become unstable when impregnated with a catalytic metal. A commercially available alumina-silica catalyst support containing about 8 weight-percent $SiO_2$ and stabilizing proportions of calcium beta alumina, has a surface area of about 164 square meters per gram and exhibits a thermal stability which is much superior to ordinary gamma aluminas. When a sample of this material (⅛inch × ⅛inch extrudates) was calcined in air at 1000°C. for 24 hours, the measured loss in volume was less than 5 percent. However, when a sample of this material was impregnated with a nitrate solution to yield a catalyst containing about 6 weight-percent copper, and then calcined in air at 1000°C. for 24 hours, it underwent an additional 21 precent loss in bulk volume and a 65 percent loss in surface area. Thus, this support material is not thermally stable in the presence of copper, and cannot be successfully employed as a support for high temperature catalysts containing copper, iron or other similar metals.

EXAMPLE III

A boria-stabilized alumina support of the present invention was prepared as follows: A sample (approximately 200 ml) of the alumina prills described in Example I was impregnated with a hot boric acid solution (about 25 g $H_3BO_3$ per 100 ml distilled water). To carry out the impregnation, the alumina prills were first preheated in an oven to 110°C., then quickly transferred to an impregnation vessel which was also preheated to about 100°C. (to preclude recrystallization of the saturated boric acid solution). The impregnation vessel was then evacuated, and the hot boric acid solution was introduced into the vessel as a fine spray. During the impregnation, the alumina prills were constantly agitated to insure good contact with the boric acid solution. Spraying was continued until the alumina was entirely covered with the impregnation solution. The prills were then aged in the solution for about 5 minutes, and then removed to a Buchner funnel and quick rinsed with one liter of distilled water, and then air dried for one hour. The prills were then oven dried in flowing air at 110° C. for approximately one hour. The compacted volume of the prills at this stage was 186 ml, and they contained 8.4 weight-percent $B_2O_3$.

The dried prills were then placed in a furnace for air calcination. The calcination temperature was increased from room temperature to 1000°C. in a period of about 4 hours, and then held constant at 1000°C. for 24 hours. Following calcination, the volume of the prills was again measured, and the compacted volume was identical to the value determined prior to the calcination step, viz, 186 ml. Thus calcination of the boric acid treated alumina prills resulted in zero volume loss (no shrinkage). The surface area of the calcined prills was about 62 $m^2/gm$.

EXAMPLES IV – VI

Three portions of alumina prills described in Example I were impregnated at 23°C. with dilute boric acid solutions to give prills containing 0.5 percent, 1.0 percent and 2.0 percent $B_2O_3$. Upon calcination as described in Example III, each sample underwent about 11 volume-percent shrinkage. Their surface areas ranged between about 52 and 66 $m^2/gm$. Thus, even very small proportions of $B_2O_3$ give some substantial stabilization.

EXAMPLE VII

The boria-stabilized prills of Example III were impregnated with a copper-cobalt nitrate solution to yield a catalyst containing about 2.8 percent CuO and 6.3 percent CoO by weight. When this catalyst was subsequently calcined in air at 1000°C. for 36 hours it underwent zero volume loss (no shrinkage). Thus, the boria-stabilized prills can be employed as a support for copper - or other metal-containing catalysts which are to be used in high temperature applications such as automobile exhaust gas conversion. This copper-containing catalyst is found to give excellent conversion of nitrogen oxides, hydrocarbons and carbon monoxide at typical exhaust gas temperatures of about 1000° – 1200°F.

The following claims and their obvious equivalents are believed to define the true scope of the invention:

I claim:

1. A method for the manufacture of a supported active metal catalyst which resists shrinkage at high temperatures, which comprises:

1. impregnating preformed, cohesive aggregates of an alumina hydrate or transition alumina support with a solution of a $B_2O_3$ precursor to incorporate therein between about 0.2 and 25 weight-percent of $B_2O_3$ equivalent;
2. calcining the impregnated support at a temperature between about 675° and 1500°C. for a time sufficient to decompose said $B_2O_3$ precursor and to substantially reduce thermal shrinkage of said support, but insufficient to reduce the surface area thereof to below about 5 $m^2/g$, said calcination being carried out prior to the addition of any catalytic metal component capable of combining with $B_2O_3$ at said calcination temperature;
3. impregnating the calcined support with a solution of a salt of at least one catalytic metal selected from Groups IB, IIB, VB, VIB, VIIB and VIII of the Periodic Table; and
4. calcining the salt-impregnated support to convert the impregnated salt or salts to an active catalytic form.

2. A method as defined in claim 1 wherein said $B_2O_3$ precursor is boric acid.

3. A method as defined in claim 1 wherein said calcining in step (2) is carried out at between about 800° and 1200°C.

4. A method as defined in claim 1 wherein the surface area of said support prior to said impregnation in step (1) is above about 100 $m^2lgm$, and wherein said calcining in step (2) is continued for a time sufficient to yield a support having a surface area between about 20 and 70 $m^2/gm$.

5. A method as defined in claim 1 wherein about 1–18 weight-percent of $B_2O_3$ equivalent is incorporated into the support during said impregnation in step (1).

6. A catalyst composition prepared by the method of claim 1, wherein the active metal or metals are selected from the class consisting of zinc, cadmium, copper, silver, chromium, molybdenum, tungsten, manganese, rhenium, iron, cobalt, nickel, ruthenium, rhodium, palladium, osmium, iridium, and platinum.

7. A method for the manufacture of a supported active metal catalyst which resists shrinkage at high temperatures, which comprises:

1. impregnating preformed, cohesive aggregates of a transition alumina support with a solution of a $B_2O_3$ precursor to incorporate therein between about 0.2 and 25 weight-percent of $B_2O_3$ equivalent;
2. calcining the impregnated support at a temperature between about 800° and 1200°C. for a time sufficient to decompose said $B_2O_3$ precursor and to substantially reduce thermal shrinkage of said support, but insufficient to reduce the surface area thereof to below about 5 $m^2/g$, said calcination being carried out prior to the addition of any catalytic metal component;
3. impregnating the calcined support with a solution of a salt of at least one catalytic metal selected from Groups IB, IIB, VB, VIB, VIIB and VIII of the Periodic Table; and
4. calcining the salt-impregnated support to convert the impregnated salt or salts to an active catalytic form.

8. A method as defined in claim 7 wherein said $B_2O_3$ precursor is boric acid.

9. A method as defined in claim 7 wherein the surface area of said support prior to said impregnation in step (1) is above about 100 $m^2/gm$, and wherein said calcining in step (2) is continued for a time sufficient to yield a support having a surface area between about 20 and 70 $m^2/gm$.

10. A method as defined in claim 7 wherein about 1–18 weight-percent of $B_2O_3$ equivalent is incorporated into the support during said impregnation in step (1).

11. A catalyst composition prepared by the method of claim 7, wherein the active metal or metals are selected from the class consisting of zinc, cadmium, copper, silver, chromium, molybdenum, tungsten, manganese, rhenium, iron, cobalt, nickel, ruthenium, rhodium, palladium, osmium, iridium, and platinum.

* * * * *